(12) United States Patent
Kettle, Jr.

(10) Patent No.: US 6,195,600 B1
(45) Date of Patent: Feb. 27, 2001

(54) METHOD OF CONTROLLING EMERGENCY BRAKE APPLICATIONS BY TWO-WAY END OF TRAIN DEVICES USING EXISTING ELECTRONIC AIR BRAKE EQUIPMENT

(75) Inventor: Paul J. Kettle, Jr., Ijamsville, MD (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/158,489

(22) Filed: Sep. 22, 1998

(51) Int. Cl.[7] ................................................. B61L 23/00
(52) U.S. Cl. ..................... 701/19; 246/167 R; 246/169 P
(58) Field of Search .............................. 701/19; 246/1 C, 246/6, 169 P, 122 R, 167 R; 340/531, 933, 825.06, 825.49

(56) References Cited

U.S. PATENT DOCUMENTS

| 5,377,938 | * | 1/1995 | Bezos et al. ................. 246/167 R |
| 5,383,717 | * | 1/1995 | Fernandez et al. .................. 303/3 |
| 5,507,457 | * | 4/1996 | Kull ................................ 246/169 P |
| 5,813,635 | * | 9/1998 | Fernandez ........................ 246/168 |

* cited by examiner

Primary Examiner—William A. Cuchlinski, Jr.
Assistant Examiner—Marthe Y Marc-Coleman
(74) Attorney, Agent, or Firm—James Ray & Associates (57) ABSTRACT

The function of a two-way end-of-train (EOT) system is coordinated with the operation of the brake equipment on a locomotive of a train according to the steps of a novel method. This method enables the brakes to be applied during an emergency in a way which minimizes the buff and draft forces produced within the train. The method includes the steps of: (1) monitoring the train for signs of an emergency by using the brake equipment of the locomotive; (2) determining, if an emergency has occurred, whether the emergency is due to disjoining of the train; (3) waiting a preset time period, if the emergency was caused by disjoining of the train, before causing the brake equipment of the locomotive, to command the two-way EOT system to initiate an emergency application of the brakes from a rear part of the train; and (4) waiting an alternative time period, if the emergency was caused other than by disjoining of the train, before causing the brake equipment of the locomotive to command the two-way EOT system to initiate the emergency application of the brakes from the rear part of the train.

19 Claims, 3 Drawing Sheets

METHOD OF CONTROLLING EMERGENCY BRAKE APPLICATIONS BY TWO-WAY END OF TRAIN DEVICES USING EXISTING ELECTRONIC AIR BRAKE EQUIPMENT

FIELD OF THE INVENTION

The invention generally relates to two-way end-of-train (EOT) radio telemetry systems used in the railroad industry. More particularly, the invention pertains to a novel method by which the electronic air brake equipment of a freight train can be used with a two-way EOT radio telemetry system to control application of the brakes on a freight train in an emergency.

BACKGROUND OF THE INVENTION

The following background information is provided to assist the reader to understand the general environment in which the invention will typically be used. The terms used herein are not intended to be limited to any one narrow interpretation unless specifically stated otherwise in this document.

Figure 1:
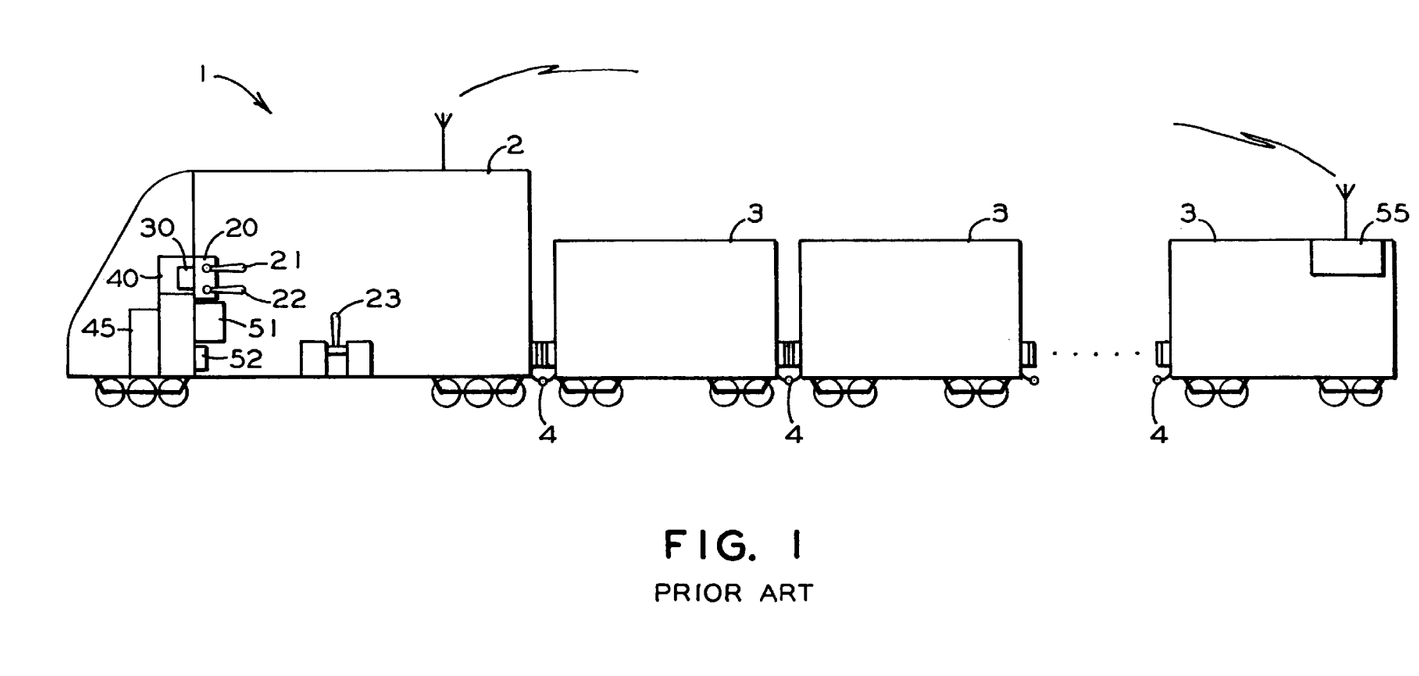
FIG. 1 illustrates a freight train equipped with electronic air brake equipment and a two-way end-of-train (EOT) radio telemetry system.
Figure 2:
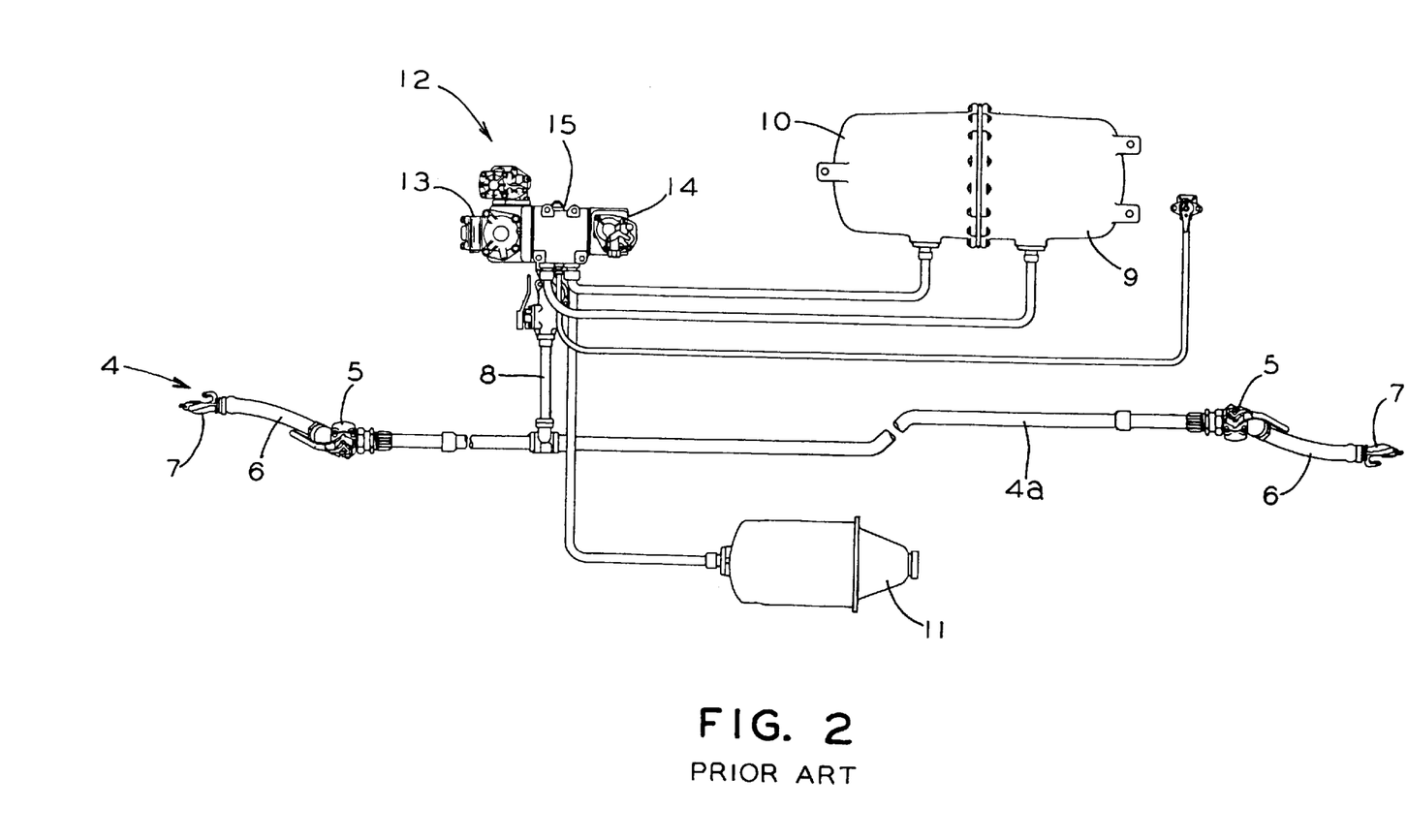
FIG. 2 illustrates the brake pipe of a freight railcar and the pneumatic brake equipment to which it connects.

As shown in FIG. 1, a typical freight train 1 includes one or more locomotives 2, a plurality of railcars 3 and a pneumatic trainline known as the "brake pipe" 4. The brake pipe is the means by which brake commands are pneumatically conveyed from the lead locomotive 2 to each of the railcars 3 in the train. As shown in FIG. 2, the brake pipe 4 is actually composed of a series of interconnected pipe lengths 4a, with one pipe length secured to the underside of each railcar. The pipe length 4a on each railcar is connected at each end to one end of an angle cock 5. Each angle cock 5 is connected at its other end to one end of a hose 6, with the other end of the hose being connected to a glad hand 7. When the glad hands of adjacent railcars are coupled together, they form a glad hand coupler—the pneumatic connection that links the pipe lengths of the adjacent railcars. The brake pipe 4 of the train is thus formed by coupling the glad hand 7 of each railcar to the glad hand of the railcar or locomotive located immediately adjacent to it. It is to the brake pipe 4 of the train that the pneumatic brake equipment on each railcar connects via a branch pipe 8. (Closing an angle cock 5 prevents air from flowing along the brake pipe to any of the railcars located downstream of the closed angle cock.)

The locomotive 2 itself has its own pneumatic trainlines including a main reservoir equalizing (MRE) pipe, an independent application and release (IAR) pipe, and an actuating pipe. Within a locomotive consist (i.e., two or more locomotives connected together), the MRE, actuating and IAR pipes of each locomotive connect to the MRE, actuating and IAR pipes of adjacent locomotives. The locomotive houses the electronic air brake equipment, such as the EPIC© 3102 or EPIC© II type brake control systems produced by the Westinghouse Air Brake Company (WABCO). As shown in FIG. 1, such equipment typically includes a cab station unit 20, a brake control computer 30, a pneumatic operating unit (POU) 40 and a locomotive interface unit (LIU) 45. Through a bank of input relays, the LIU conveys various input signals to the brake control computer 30. Through a bank of output relays in the LIU, the computer 30 can provide various output signals to other equipment in the locomotive.

The cab station unit 20 houses the automatic and independent brake handles 21 and 22, and generates various signals including those representing the positions of the brake handles 21 and 22. These signals are conveyed to the brake control computer 30. Based on the inputs it receives and the software that dictates its operation, the brake control computer 30 controls the overall operation of the brakes. According to the commands it receives, including those from the brake control computer 30, the POU 40 affects the pressure in the IAR and brake pipes, as well as in the other pneumatic trainlines, and thereby controls the brakes on the train.

The POU 40 features a pneumatic laminate to which the brake control computer 30 and various pneumatic and electropneumatic operating portions mount. Through a number of ports and internal passages, the pneumatic laminate interconnects these operating portions to each other and to branch pipes that carry air from or to the actuating pipe, the MRE pipe, the IAR pipe, the brake pipe, the brake cylinder and/or various storage tanks such as the equalizing reservoir in the locomotive. Among the various devices mounted to the pneumatic laminate are the independent application and release (IAR) portion, the brake cylinder (BC) control portion and the brake pipe (BP) control portion. As alluded to previously, it is primarily the brake control computer 30, based on the inputs it receives and the software that dictates its operation, that controls the operation of these three operating portions of the POU 40.

As shown in FIG. 2, the pneumatic brake equipment on a typical freight railcar includes two storage reservoirs 9/10, one or more brake cylinders 11 and at least one brake control valve 12 such as an ADB, ABDX or ABDW type valve made by the Westinghouse Air Brake Company (WABCO). The brake control valve 12 has a service portion 13 and an emergency portion 14 typically mounted on a pipe bracket 15. The pipe bracket features a number of internal passages and several ports. Each port connects to one of the interconnecting pipes from the railcar such as those leading to the brake pipe, the brake cylinder and the two reservoirs. It is through the ports and internal passages of the pipe bracket 15 that the service and emergency portions 13 and 14 of the brake control valve 12 communicate fluidly with the pneumatic piping on the railcar.

The automatic brake handle 21 can be moved from and in between a release position at one extreme in which brake pipe pressure is maximum and the brakes are completely released to an emergency position at another extreme in which brake pipe pressure is zero and the brakes are fully applied. The automatic brake handle positions include release, minimum service, full service, suppression, continuous service and emergency. Between the minimum and full service positions lies the service zone wherein each incremental movement of the automatic brake handle 21 toward the full service position causes the pressure within the brake pipe 4 to reduce incrementally.

By moving the automatic brake handle 21, the operator can control the pressure level in the brake pipe 4 and thereby direct whether, and to what extent, the brakes on both the locomotive(s) and the railcars are applied. More specifically, moving the automatic brake handle causes the brake control computer 30 to affect the operation of the BP control portion of the POU 40. The BP control portion, in turn, affects the pressure within the equalization reservoir of the locomotive whose pressure the brake pipe 4 generally mimics. The pressure in the brake pipe 4, in turn, affects not only the operation of the brake control valve(s) 12 on each railcar 3 but also the operation of the BC control portion in the locomotive 2.

Dependent on the position of the automatic brake handle 21, the pressure level within the brake pipe 4 determines whether the brake control valve 12 on each railcar will charge its reservoirs 9/10 or deliver pressurized air previously stored in one or both of its reservoirs 9/10 to the brake cylinders 11. By changing its pressure level using the automatic brake handle, the brake pipe 4 is used to convey release, service and emergency brake commands to the pneumatic brake equipment on each railcar 3 in the train.

When the automatic brake handle is moved to its release position, the brake control computer 30 commands the BP control portion to increase pressure within the equalizing reservoir and thus the brake pipe 4. The MRE pipe in the locomotive is used to charge the brake pipe 4 to a normal maximum operating pressure via the BP control portion. In response to this release brake command (i.e., when brake pipe pressure is restored to the maximum pressure set by the operator), the service portion 13 of each brake control valve 12 not only charges its two reservoirs 9/10 with the pressurized air it receives from the brake pipe 4 but also vents its brake cylinders 11 to atmosphere thereby causing the brakes on the railcar to release. The BC control portion in the locomotive also responds pneumatically to the increase in brake pipe pressure by venting air from the brake cylinders of the locomotive. Moving the automatic brake handle to its release position also causes the brake control computer to command electrically the solenoid valves of BC control portion to depressurize the locomotive brake cylinders. The BC control portion thus releases the locomotive brakes by responding both pneumatically to the increase in brake pipe pressure and electrically to electrical brake release commands issued by the brake control computer 30.

When the automatic brake handle 21 is moved into the service zone, the brake control computer 30 commands the BP control portion to reduce pressure within the equalizing reservoir and thus the brake pipe 4, though in a manner corresponding to handle position. In response to this service brake command (i.e., when brake pipe pressure is reduced at a service rate), the service portion 13 of each brake control valve 12 supplies air from only one of its two reservoirs 9 to its brake cylinders 11 so as to apply the brakes on the railcar. How much the brake pipe pressure is reduced, and thus the magnitude of the service brake application, depends on how far the automatic brake handle 21 is moved towards the full service position. Meanwhile, pressure transducers provide electrical signals indicative of the current pressures in the equalizing reservoir and brake pipe 4 to the brake control computer 30. Based in part on these signals, the brake control computer 30 then commands the BC control portion in the locomotive 2 to direct air from the main reservoir to the locomotive brake cylinders to apply the brakes of the locomotive.

When the automatic brake handle 21 is moved into the emergency position, the brake control computer 30 commands the BP control portion to reduce the pressure in the brake pipe 4 in the aforementioned manner. In addition, the brake equipment energizes two emergency magnet valves located in the BP control portion. One emergency magnet valve is energized by the brake control computer 30 whereas the other emergency magnet valve is energized directly by a microswitch that closes when the automatic brake handle 21 is moved into its emergency position. Through these two emergency magnet valves, the BP control portion vents the brake pipe 4 to atmosphere at an emergency rate via its emergency vent valve. In response to this emergency brake command, the service and emergency portions 13/14 of each brake control valve 12 supplies air from both reservoirs 9/10 to the brake cylinders 11 so as to apply the brakes of the railcar fully. The emergency portion 14 on each brake control valve 12 also serves to propagate the emergency brake command along the brake pipe 4 by rapidly venting its portion of the brake pipe 4a to atmosphere. This accelerates the pressurizing of the brake cylinders 11 on each railcar 3 and thereby reduces the distance that the train needs to stop. The BC control portion in the locomotive 2 also responds to this precipitous drop in brake pipe pressure by directing air from the main reservoir to the locomotive brake cylinders thereby quickly applying the brakes of the locomotive.

Another way to apply the train brakes in an emergency is by use of a dual-ported valve referred to as the conductor's valve 23 (also referred to as the helper's valve). By moving the handle of this valve to the open (i.e., emergency) position, the conductor's valve not only vents the brake pipe to atmosphere at an emergency rate but also allows air from the main reservoir of the locomotive to flow to, and thus close, an emergency pressure switch (EMPS). When closed, the EMPS provides battery voltage to one of the input relays of the LIU 45. It is through this EMPS input relay that the LIU signals the brake control computer 30 that the emergency was initiated by the train operator, or by another person located in the same compartment as the operator, rather than by the train breaking apart as described below.

The independent brake handle 22 can be moved from and in between a release position at one extreme to a full apply position at the other extreme. The range encompassing a point just next to the release position up to and including the full apply position is referred to as the application zone. When the handle is moved to the release position, the brake control computer 30 responds by commanding the IAR control portion of the POU 40 to exhaust air from the IAR pipe. The BC control portion of the POU 40 responds pneumatically to this loss in IAR pipe pressure by venting air from the locomotive brake cylinders thereby releasing the locomotive brakes. Conversely, when the handle 22 is moved into the application zone, the brake control computer 30 responds by commanding the IAR portion to raise the pressure in the IAR pipe. How much the IAR pipe pressure is increased depends on how far into the application zone the handle 22 is placed. Responding pneumatically to the resulting increase in IAR pipe pressure, the BC control portion directs air to the locomotive brake cylinders thereby applying the locomotive brakes. The pressure in the IAR pipe and the locomotive brake cylinders thus reduces and increases in proportion to the position of the independent brake handle 22.

The BC control portion also controls the pressure in the locomotive brake cylinders in response to pressure carried by the brake pipe as noted above. In a manner well known in the industry, the BC control portion can also control the pressure in the locomotive brake cylinders in response to the electrical commands generated by movement of the brake handles 21 and 22.

Another position in which the independent brake handle 22 can be moved is the actuation position, also known as the bail off position. When tilted to the bail off position, the independent brake handle 22 causes the brake control computer 30 to command the IAR control portion to charge the actuating pipe. Once the pressure in the actuating pipe rises above a preset level, the brake control computer 30 responds by commanding the BC control portion to release the pressure from the brake cylinders of the locomotive. The brake control computer 30 will continue to allow the pressure to drop as long as the handle 22 is held in the bail off position. The handle can be allowed to move (i.e., untilt) out of its bail off position at any time. Then, depending on the position that handle 22 currently occupies or to which it is rotated in its range of motion, the brake control computer 30 will command the BC control portion to keep the locomotive brake cylinders at whatever pressure they currently retain or to increase their pressure to the desired level. It is in this manner that the independent brake handle 22 can also be used to bail off the brakes of the locomotive(s) while the brakes of the railcars remain applied.

On each railcar and locomotive, each brake cylinder converts to mechanical force the pressurized air that it receives from its corresponding brake control valve. From the brake cylinder this force is transmitted by mechanical linkage (not shown) to the brake shoes (not shown) causing the brake shoes to be forced against, and thus to slow or stop the rotation of, the wheels of the rail vehicle. The magnitude of the braking force applied to the wheels is directly proportional to the pressure built up in the brake cylinders 11. Conveyed along the brake pipe 4 to the pneumatic brake equipment on each railcar 3, it is thus the pneumatic brake commands that determine whether, and to what extent, the brakes of the freight train 1 will be applied.

A freight train 1 may also be equipped with a two-way end-of-train (EOT) radio telemetry system such as the TRAINLINK® II EOT system designed and manufactured by WABCO. Developed under the auspices of the American Association of Railroads (AAR), two-way EOT systems typically feature a locomotive control unit (LCU) 51 in the lead locomotive 2 and an EOT unit 55 connected to the brake pipe typically on the last railcar in the train. Also referred to as a head of train (HOT) unit, the LCU is mounted to the train operator's console in the locomotive 2.

By radio signals, the EOT unit 55 transmits to the HOT unit 51 data pertaining to the pressure in the brake pipe and the motion of the last railcar. To accomplish this, the EOT unit 55 includes a pressure transducer to monitor brake pipe pressure, a motion sensor to sense movement of the last railcar, a microprocessor unit to control the overall operation of these components and a transceiver (i.e., combination transmitter and receiver) that the microprocessor unit uses to transmit this last railcar data. The HOT unit 51 includes a primary display, a transceiver to receive transmissions from the EOT unit and a microprocessor unit. Controlled by this microprocessor unit, the HOT display is used to visually convey the last railcar data to the train operator. Furthermore, in response to an emergency command transmitted by the EOT unit 55, the HOT unit 51 will also display that an emergency condition exists at the rear of the train. The EOT unit is typically configured so that the emergency condition represents a sudden loss of brake pipe pressure or a drop in brake pipe pressure below a preset level.

For a freight train not equipped with a two-way EOT system, the emergency brake application starts at the locomotive and progresses along the brake pipe to the last railcar. For a long freight train, reducing the pressure in the brake pipe 4 from the head of the train can be quite time consuming. (NOTE: An emergency application is initiated at a rate much faster than a service application. As the brake control valves on each railcar vent locally, the maximum speed at which the reduction propagates could approach, theoretically, the speed of sound. It is normally slower than this, however, say in the range of 900 fps. Consequently, for a one mile long train, the propagation time would be more in the range of 10 to 15 seconds. In contrast, a service application can take well over a minute to reach the last railcar, hence the need for, and development of, WABCO's TRAINLINK® ES system described below.) Moreover, if there is a restriction in the brake pipe 4 or if one of the angle cocks 5 is left closed, the pneumatic brake equipment on the railcars 3 beyond the restriction may not receive the emergency brake command needed to apply the brakes in an emergency.

It is for this reason that the HOT unit 51 is equipped with an emergency toggle switch and the EOT unit 55 equipped with an emergency brake valve. By toggling this switch in an emergency, the train operator can cause the HOT unit 51 to transmit a radio emergency brake signal to the EOT unit 55. By its microprocessor unit, the EOT unit responds to this emergency signal by commanding its emergency brake valve to reduce, at an emergency rate, the pressure in the brake pipe from the rear of the train. Combined with the emergency reduction in brake pipe pressure initiated from the head end of the train using the brake equipment in the locomotive 2, the two-way EOT system allows the railcar brakes to be applied more quickly in an emergency. The HOT unit 51 also has a supplemental display by which it visually conveys additional information to the train operator such as data related to arming of the EOT system and verification of communications between the HOT and EOT units.

As the brake pipe 4 of a freight train is used to convey service brake commands as well as emergency brake commands to the railcars, a freight train may be equipped with a more advanced EOT radio telemetry system, such as the TRAINLINK® ES system. In addition to the two-way HOT and EOT units, the TRAINLINK® ES system has a Service Interface Unit (SIU) 52 that connects between the serial port of the HOT unit and the brake pipe 4 on the locomotive 2. The SIU keeps the microprocessor of the HOT unit constantly apprised of the pressure level within the brake pipe at the head of the train. This allows the HOT unit to automatically initiate a service brake application at the last railcar simultaneously with the service reduction in brake pipe pressure initiated from the locomotive. Specifically, the HOT unit 51 in the locomotive automatically transmits a radio service brake signal to the EOT unit 55 when it detects a service reduction in brake pipe pressure via the SIU 52. By its microprocessor unit, the EOT unit 55 in this TRAIN-LINK® ES type system responds to the service brake signal by commanding its brake valve to reduce the brake pipe pressure from the last railcar at the same service rate as that ordered by the locomotive brake equipment at the head of the train. A service application of the brakes can thus be made much faster on a train equipped with a TRAINLINK® ES or similar type EOT system. Using the SIU 52, the HOT unit 51 can also automatically transmit an emergency brake signal when an emergency reduction in brake pipe pressure has been initiated from the locomotive 2. The emergency toggle switch on the HOT unit 51 can also be used to manually transmit the emergency brake signal.

From the foregoing, it should be evident that there are several situations that would compel a train operator to activate the emergency brake application feature of the EOT system. One example would be a lack of braking effort caused by an obstruction in the brake pipe between the lead locomotive 2 and one of the railcars 3 (e.g., one or more angle cocks left closed or other restriction in the brake pipe). This would prevent service and emergency brake commands from propagating along the brake pipe to the rear of the train. Another example would be a failure of the locomotive brake equipment that would prevent application of the service and/or emergency brakes in the usual manner. For whatever reason the EOT emergency brake application feature is activated, it is still desirable that the brakes on every vehicle in the train be applied in the shortest possible time. Even during an emergency, the brakes must still be operated in a way that would neither exceed the capabilities of the brake equipment nor violate the applicable regulations of the Federal Railroad Administration (FRA).

It is well known that a freight train is subject to buff (compressive) and draft (tensive) forces during both normal and emergency operation. Buff forces are quite strong when the brakes of the train are activated only from the head of the train, especially during an emergency. Moreover, activating the brakes from the rear of the train via the EOT system simultaneously with the emergency reduction in brake pipe pressure initiated from the locomotive can cause both buff and draft forces to develop within the train. The intensity of these buff and draft forces depends on many factors such as the speed and length of the train, grade of the railway track and the degree of tractive power provided by the locomotive engines.

An important part of operating a freight train involves controlling the buff and draft forces that develop within it to safe levels. Minimizing buff forces is important as damage to the railcars and their cargo can occur if the in-train buff forces are not kept below critical levels. Preventing excessive draft forces is a priority because a train could conceivably break in two if the in-train draft forces become too strong. Though the separated rear part of a disjoined train would eventually stop because its brake pipe is open to atmosphere, the rear part could collide with the front part of the train. Whether the separated rear part would actually catch up and collide with the front part depends on many factors such as the speed and length of the two parts, the grade of the railway track and how the controlling locomotive is operated. For example, the independent brake handle 22 could be used to bail off the locomotive brakes, or the tractive effort provided by locomotive engines could be increased. These actions, taken together or individually, would reduce the likelihood of a collision.

The railroad industry has traditionally treated the electronic air brake equipment in the locomotive and the EOT radio telemetry system as separate pieces of equipment. Consequently, the functions of these two systems have been left largely uncoordinated in regards to emergency brake applications. In TRAINLINK® II type EOT systems, an emergency reduction in brake pipe pressure made from the rear of the train can only be initiated manually via the toggle switch on the HOT unit 51. In TRAINLINK® ES type EOT systems, the emergency brake application feature can be activated automatically via the HOT unit but only upon the SIU 52 having first detected an emergency reduction in brake pipe pressure made from the locomotive 2. Before the invention presented in this document, no system or method had been proposed to coordinate the actions of the locomotive air brake equipment and the two-way EOT system with the goal of minimizing the buff and draft forces encountered within a train.

OBJECTIVES OF THE INVENTION

It is, therefore, a primary objective of the invention to provide a method of coordinating the actions of the electronic air brake equipment in the locomotive with the EOT radio telemetry system on a freight train so as to assure that the brakes of the freight train are applied more safely during an emergency than is possible with prior art methods.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

In a presently preferred embodiment, the invention provides a method of coordinating the actions of a two-way end-of-train (EOT) system on a train with the brake equipment on a locomotive of the train during an emergency. This method enables the brakes of the train to be applied during an emergency in a way which minimizes the buff and draft forces produced within the train. The method includes the steps of: (1) monitoring the train for signs of an emergency by using the brake equipment of the locomotive; (2) determining, if an emergency has occurred, whether the emergency is due to disjoining of the train; (3) waiting a preset time period, if the emergency was caused by disjoining of the train, before causing the brake equipment of the locomotive, to command the two-way EOT system to initiate an emergency application of the brakes from a rear part of the train; and (4) waiting an alternative time period, if the emergency was caused other than by disjoining of the train, before causing the brake equipment of the locomotive to command the two-way EOT system to initiate the emergency application of the brakes from the rear part of the train.

DETAILED DESCRIPTION OF THE INVENTION

Before describing the invention in detail, the reader is advised that, for the sake of clarity and ease of understanding, the invention is described in the following text as if carried out by the type of prior art equipment mentioned in the background section of this document. Despite being described in this particular context, it should be apparent from a reading of this document that the invention may be carried out using brake control equipment and EOT systems made by companies other than the Westinghouse Air Brake Company (WABCO). The invention is presented is in this context not to limit the scope of the claims set forth below but merely to simplify the description, and consequently the understanding, of the invention.

In particular, the method of the invention is described as if implemented in an EPIC© type brake control system and a TRAINLINK® type EOT radio telemetry system. The invention primarily implicates the brake control computer 30 of the EPIC© brake control system and the HOT unit 51 of the TRAINLINK© EOT system. The invention can be carried out by making certain modifications to the hardware of both systems and by adding algorithms embodying the following method steps into the programming code of the brake control computer 30.

Figure 3:
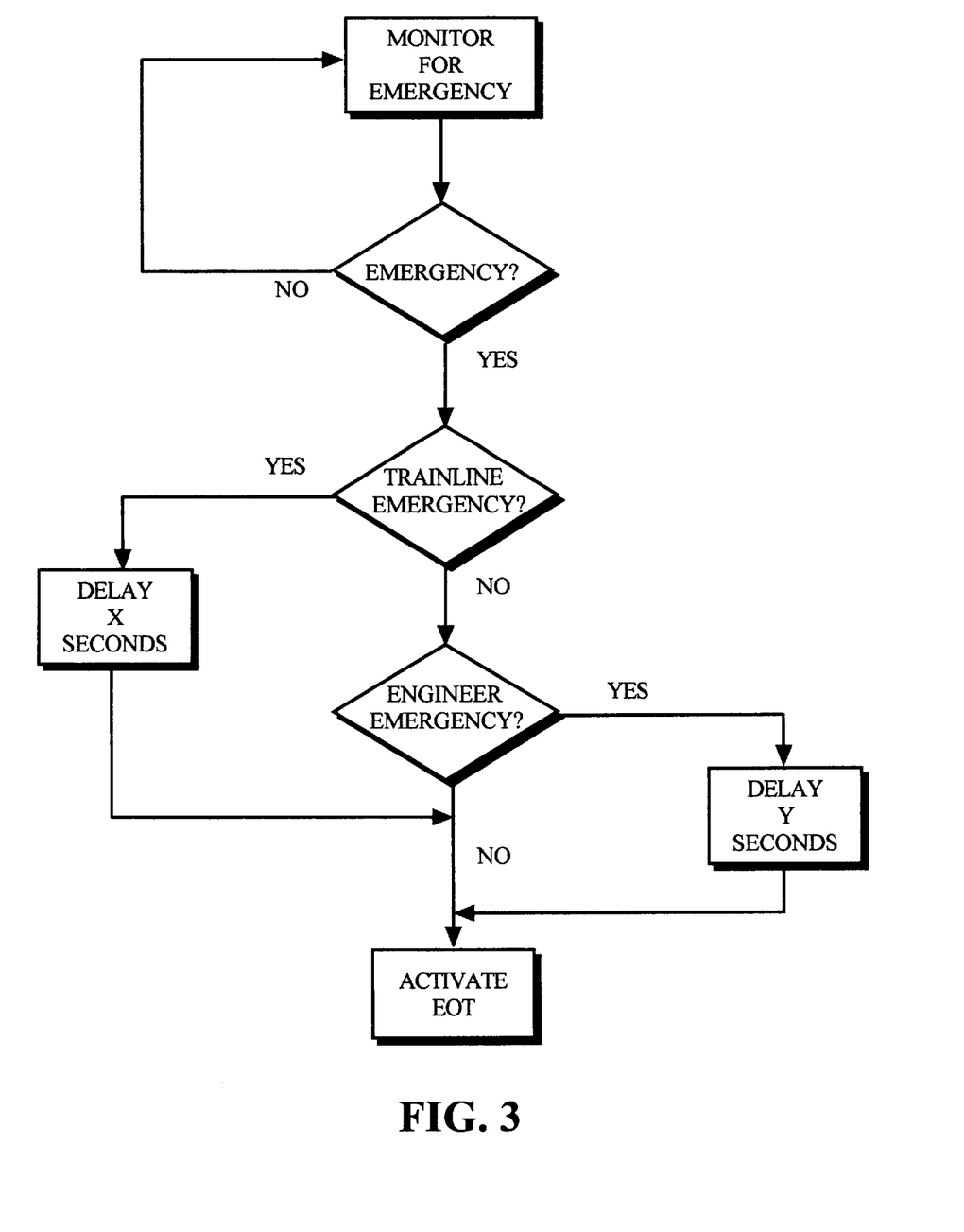
FIG. 3 is a block diagram of the steps of the method according to the invention.

Referring now to the invention, FIG. 3 illustrates the essential steps for a method of coordinating the actions of the brake control system in the locomotive with the two-way EOT system on the train. The steps of the method are basically as follows. First, using the brake equipment in the locomotive, the train is monitored for signs of an emergency. Second, if an emergency has occurred, it must be determined whether the emergency is due to disjoining of the train. Third, if the emergency was caused by a disjoining of the train, the method requires waiting a preset time period. Once the preset time has expired, the locomotive brake equipment is used to command the two-way EOT system to initiate an emergency application of the brakes from a rear part of the train. Fourth, if the emergency resulted from a cause other than the train breaking apart, the method requires waiting an alternative time period. Once the alternative time period has expired, the locomotive equipment is used to command the two-way EOT system to initiate the emergency application of the brakes from the rear of the train.

Regarding the first and second steps of the invention, the brake control computer 30 of the EPIC© type brake control system can be used to monitor the brake equipment of the locomotive for most signs of an emergency. Many operating parameters can be taken into account in determining whether an emergency has occurred. The exact number and combination of input parameters will depend on the particular demands of the railroad operating authority for whom the invention is provided. Operating according to algorithms incorporated into its programming code, the brake control computer 30 can determine from the presence or absence of such inputs whether an emergency has indeed occurred and, if so, if it was caused by disjoining of the train. For example, the computer 30 can be used to monitor, essentially simultaneously, the automatic brake handle 21, the EMPS input relay of the LIU 45 and various other known components or subsystems of the locomotive brake equipment. Placement of the automatic brake handle 21 into the emergency position is, of course, an indication that the emergency was initiated by the train operator rather than by disjoining of the train. Similarly, the battery signal supplied from the EMPS input relay of the LIU also indicates that the emergency was initiated by the train operator (or by another person located in the same compartment as the operator), but, in this case, from the conductor's valve 23.

It is well known that the brake control computer 30 uses certain transducers to monitor the pressure within various pneumatic trainlines and reservoirs on the locomotive. The brake pipe transducer provides a signal indicative of pressure within the brake pipe, and another transducer similarly monitors pressure within the equalization reservoir. Assume, for example, that the brake control computer 30 from one or more transducers receives signal(s) indicating that the brake pipe pressure is dropping at an emergency rate. Further assume that the computer reads that (i) the automatic brake handle 21 has not been placed in the emergency position and (ii) no battery signal was received from the LIU EMPS input relay. Operating according to the new algorithms in its programming code, the brake control computer 30 can determine from this particular combination of inputs that an emergency does indeed exist and that it was caused either by disjoining of the train or by another serious problem likewise manifested in a very high rate of leakage from the brake pipe.

Alternatively, assume that the brake control computer 30 reads that either (i) the automatic brake handle 21 has been placed in the emergency position or (ii) the battery signal was received from the EMPS input relay of the LIU 45, or both. From this particular set of inputs, the brake control computer 30 would determine that an emergency has occurred, but that it was initiated manually in the locomotive (s) by the train operator or another person located in the same compartment as the operator.

The third and fourth steps of the invention require that modifications be made to the hardware of both the brake control system and the EOT radio telemetry system. It was noted in the background section of this document that the LIU 45 has a bank of output relays by which the brake control computer 30 can provide various output signals to other equipment in the locomotive. One of these output relays or a new relay altogether, hereinafter referred to as the HOT output relay, could be wired into a new circuit containing the brake control computer 30 and the HOT unit 51. Specifically, the HOT output relay could be wired so that its contacts are in parallel circuit relationship with the contacts of the emergency toggle switch in the HOT unit 51, and its coil energizable by the brake control computer 30. By energizing the coil and thereby closing the contacts of the HOT output relay, the brake control computer 30 can command the HOT unit 51 to transmit an emergency brake signal to the EOT unit 55 located at or near the rear of the train.

Despite being modified in this manner, the HOT unit would still be able to perform all of the functions previously attributed to it by the prior art. Specifically, the emergency toggle switch on the HOT unit 51 could still be used to manually transmit the emergency brake signal. Likewise, for a TRAINLINK® ES type EOT system, the HOT unit 51 would still be capable of automatically transmitting the emergency brake signal in response to an emergency reduction in brake pipe pressure detected by the SIU 52 in the locomotive 2. Regardless of how the HOT unit is commanded to transmit the emergency brake signal, the EOT unit 55 would, of course, still respond to this emergency brake signal by commanding its emergency brake valve to reduce, at an emergency rate, the pressure in the brake pipe at the rear of the train.

Regarding the third step of the invention, when it detects that the train has disjoined, the brake control computer 30 energizes the coil of the HOT output relay after the preset time period has expired. To reduce the probability of the separated rear part from catching up to and colliding with the front part of the train, the preset time period is preferably set at zero seconds. Given this preferred zero-second delay, the brake control computer 30 would close the contacts of the HOT output relay as soon as it detects that the train has broken apart. The HOT unit 51 would then immediately respond to the closing of the contacts by transmitting the emergency brake signal. The goal of this third method step would then be achieved, that is, the EOT unit has been commanded to activate. The EOT unit 51 responds to the emergency brake signal by commanding its emergency brake valve to reduce, at an emergency rate, the brake pipe pressure from the rear of the train. Combined with the high rate of leakage from the brake pipe at the point at which the rear part separated, the extra reduction in pressure made by the EOT unit 55 allows the brakes of the rear part to be applied even more quickly during this emergency.

Regarding the fourth step of the invention, when it detects that the emergency has resulted from a cause other than the train breaking apart, the brake control computer 30 will not command the HOT unit 51 to transmit the emergency brake signal until the alternative time period has expired. Operating according to algorithms added to its programming code, the brake control computer 30 can be used to calculate how long this delay should last based on the operating parameters of the train. For example, if it is determined that the emergency was caused by the automatic brake handle 21 being placed into the emergency position, an alternative time period of seven (7) seconds could be imposed. Assuming such a delay, the emergency reduction in pressure initiated from the locomotive 2 has seven seconds to propagate along the brake pipe 4 towards the rear of the train before the brake control computer 30 commands the HOT unit 51 to transmit the emergency brake signal. By waiting the alternative time period before using the EOT unit 55 to begin applying the brakes at the rear, the brakes of the vehicles at the front would begin to apply first thereby tending to minimize the draft forces experienced by the vehicles in the train. Coordinating the actions of the computer 30 and the HOT unit 51 in this manner allows the brakes of the train to be applied more safely during such an emergency than is possible with prior art methods.

The length of the preset and alternative time periods will depend on the specific braking equipment used by, and the operating philosophy of, the railroad operating authority for whom the invention is provided. For emergencies caused by disjoining of the train, a delay of zero seconds will probably be preferred. This further reduces the likelihood of a collision between the separated front and rear parts of the train. For other emergencies, the brake control computer 30 is preferably programmed to select the time delay according to the specific type of emergency that occurred. Other factors may also be taken into account in determining the alternative time period, such as length and speed of the train, grade of the railway track on which the train is travelling, whether the independent brake handle 22 is in the bail off position, and the degree of tractive power provided by the locomotive. For freight trains, the alternative time period will typically be less than the preset time period and fall in the range of zero to ten seconds.

From the foregoing, it should be apparent that this method can be embodied in various combinations of locomotive brake equipment and EOT radio telemetry systems. This includes the EPIC© 3102 and EPIC© II brake control systems and the TRAINLINK® II and TRAINLINK® ES type EOT systems made by WABCO. The method could be embodied in such combinations either alone or in conjunction with equipment provided by builders of train locomotives such as the Integrated Cab Electronics (ICE) system made by General Motors Corporation or the Integrated Function Control (IFC) system produced by General Electric Corporation.

By way of illustration, the method could alternatively be implemented using the cab control computer of the cab station unit 20 (shown in FIG. 1) along with the onboard computer of the ICE or IFC systems. As is well known in the rail industry, the onboard computer is interfaced with many of the various subsystems on the train including, in some locomotives, the HOT unit 51 of the EOT radio telemetry system. Consequently, from the cab station unit 20 alone, or in combination with the brake control computer 30, a serial communications link can be had via the onboard computer to the HOT unit 51. Through this communications link, the HOT unit 51 could be commanded to transmit the emergency brake signal pursuant to the method presented in this document. This, of course, would eliminate the need for the aforementioned HOT output relay.

Having now disclosed the basic steps of the invention, it is well within the abilities of one of ordinary skill in the brake control art to implement the method using the prior art equipment described above. The invention requires relatively little modification to the hardware. Logic embodying the steps of the method can be codified and incorporated into the programming code of the computer (e.g., brake control computer 30) by which the invention will primarily be implemented.

Regardless of how the invention is implemented, by coordinating the action of the locomotive brake equipment with the EOT system, the method allows the brakes to be applied during an emergency in a way which minimizes the buff and draft forces produced within the train. Reducing the force with which adjacent vehicles bump into each other (buff forces) means that damage is less likely to be suffered by the vehicles, the couplers that connect them and the cargo they carry. Reducing the force with which adjacent vehicles pull apart from each other (draft forces) means that the train is less likely to break apart and suffer damage to its couplers. The method presented herein enables the combined systems to apply the brakes, during an emergency, in a safer manner than would otherwise be possible using prior art methods.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and the useful arts, I secure for myself by Letters Patent exclusive rights to all subject matter embraced by the following claims for the time prescribed by the Patent Act.

I claim:

1. A method of coordinating operation of a two-way end-of-train (EOT) system of a train with brake equipment on a locomotive of said train to control application of brakes on said train in an emergency, said method comprising the steps of:
    (a) monitoring said train for signs of an emergency by using said brake equipment of said locomotive;
    (b) determining, if said emergency has occurred, whether said emergency is due to disjoining of said train;
    (c) waiting a preset time period, if said emergency was caused by disjoining of said train, before causing said brake equipment of said locomotive, to command said two-way EOT system to initiate an emergency application of said brakes from a rear part of said train; and
    (d) waiting an alternative time period, if said emergency was caused other than by disjoining of said train, before causing said brake equipment of said locomotive to command said two-way EOT system to initiate said emergency application of said brakes from said rear part of said train.

2. The method, as claimed in claim 1, wherein said preset time period is zero seconds.

3. The method, as claimed in claim 1, wherein said alternative time period lies in the range of zero to ten seconds.

4. The method, as claimed in claim 1, wherein said preset time period is less than said alternative time period, said alternative time period being dependent on factors such as speed and length of said train, grade of railway track on which said train is travelling and degree of tractive power provided by said locomotive.

5. The method, as claimed in claim 1, wherein the step of monitoring said train for signs of an emergency includes the substeps of:
    (a) monitoring whether an automatic brake handle has been placed into an emergency position;
    (b) monitoring whether a conductor's valve is open or closed; and
    (c) monitoring a pressure transducer connected to a brake pipe of said locomotive for whether pressure therein is changing at a rate indicative of said emergency.

6. The method, as claimed in claim 1, wherein said preset time period is calculated based on operating parameters of said brake equipment during said emergency.

7. The method, as claimed in claim 1, wherein said alternative time period is calculated based on operating parameters of said brake equipment during said emergency.

8. A method of coordinating operation of brake equipment on a locomotive of a train with a two-way end-of-train (EOT) system on said train so as to minimize buff and draft forces within said train during an emergency, said brake equipment including a computer that controls operation of said brake equipment, said EOT system including an HOT unit in said locomotive and an EOT unit connected to a brake pipe on a railcar of said train, said method comprising the steps of:

(a) using said computer to monitor said brake equipment of said locomotive for signs of an emergency;

(b) determining, if said emergency has occurred, whether said emergency is due to disjoining of said train;

(c) waiting a preset time period, if said emergency was caused by disjoining of said train, before using said computer to command said HOT unit to transmit an emergency brake signal and thereby order said EOT unit to reduce pressure in said brake pipe at an emergency rate so as to initiate an emergency application of brakes of said train from said railcar; and (d) waiting an alternative time period, if said emergency was caused other than by disjoining of said train, before causing said computer to command said HOT unit to transmit said emergency brake signal and thereby order said EOT unit to reduce pressure in said brake pipe at said emergency rate so as to initiate said emergency application of said brakes from said railcar.

9. The method, as claimed in claim 8, wherein said railcar is the last railcar in said train.

10. The method, as claimed in claim 8, wherein said preset time period is zero seconds.

11. The method, as claimed in claim 8, wherein said alternative time period lies in the range of zero to ten seconds.

12. The method, as claimed in claim 8, wherein said preset time period is less than said alternative time period, said alternative time period being dependent on factors such as speed and length of said train, grade of railway track on which said train is travelling and degree of tractive power provided by said locomotive.

13. The method, as claimed in claim 8, wherein step (a) includes the substeps of:

(a) monitoring whether an automatic brake handle has been placed into an emergency position;

(b) monitoring whether a conductor's valve is open or closed; and (c) monitoring a pressure transducer connected to said brake pipe of said locomotive for whether pressure therein is changing at a rate indicative of said emergency.

14. The method, as claimed in claim 8, wherein said computer calculates said preset time period based on operating parameters of said brake equipment during said emergency.

15. The method, as claimed in claim 8, wherein said computer calculates said alternative time period based on operating parameters of said brake equipment during said emergency.

16. A method of coordinating operation of brake equipment on a locomotive of a train with a two-way end-of-train (EOT) system on said train during an emergency, said EOT system including an HOT unit in said locomotive and an EOT unit connected to a brake pipe on a railcar of said train, said method comprising the steps of:

(a) using a computer to monitor said brake equipment of said locomotive for signs of an emergency;

(b) determining, if said emergency has occurred, whether said emergency is due to disjoining of said train;

(c) waiting a preset time period, if said emergency was caused by disjoining of said train, before using said computer to command said HOT unit to transmit an emergency brake signal and thereby order said EOT unit to reduce pressure in said brake pipe at an emergency rate so as to initiate an emergency application of brakes of said train from said railcar; and (d) waiting an alternative time period, if said emergency was caused other than by disjoining of said train, before causing said computer to command said HOT unit to transmit said emergency brake signal and thereby order said EOT unit to reduce pressure in said brake pipe at said emergency rate so as to initiate said emergency application of said brakes from said railcar.

17. The method, as claimed in claim 16, wherein step (a) includes the substeps of:

(a) monitoring whether an automatic brake handle has been placed into an emergency position;

(b) monitoring whether a conductor's valve is open or closed; and (c) monitoring a pressure transducer connected to said brake pipe of said locomotive for whether pressure therein is changing at a rate indicative of said emergency.

18. The method, as claimed in claim 16, wherein said computer calculates said preset time period based on operating parameters of said brake equipment during said emergency.

19. The method, as claimed in claim 16, wherein said computer calculates said alternative time period based on operating parameters of said brake equipment during said emergency.

* * * * *